H. J. NOLL.
BOLSTER SPRING.
APPLICATION FILED AUG. 6, 1908.
955,673.
Patented Apr. 19, 1910.
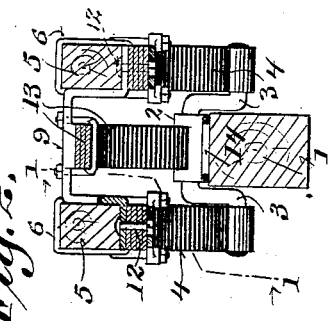
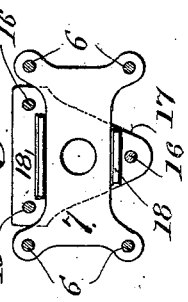
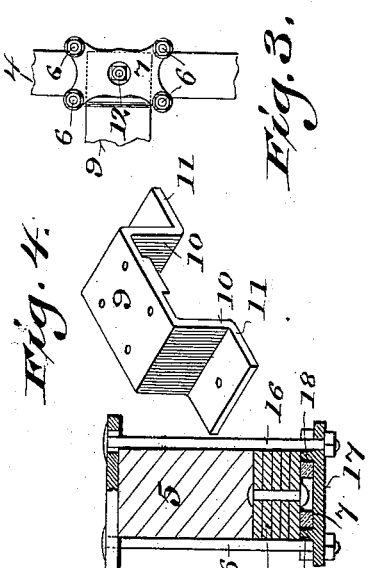
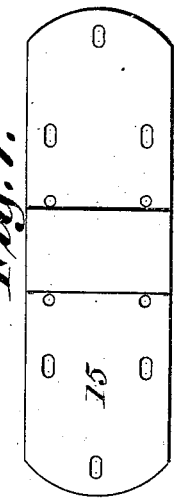
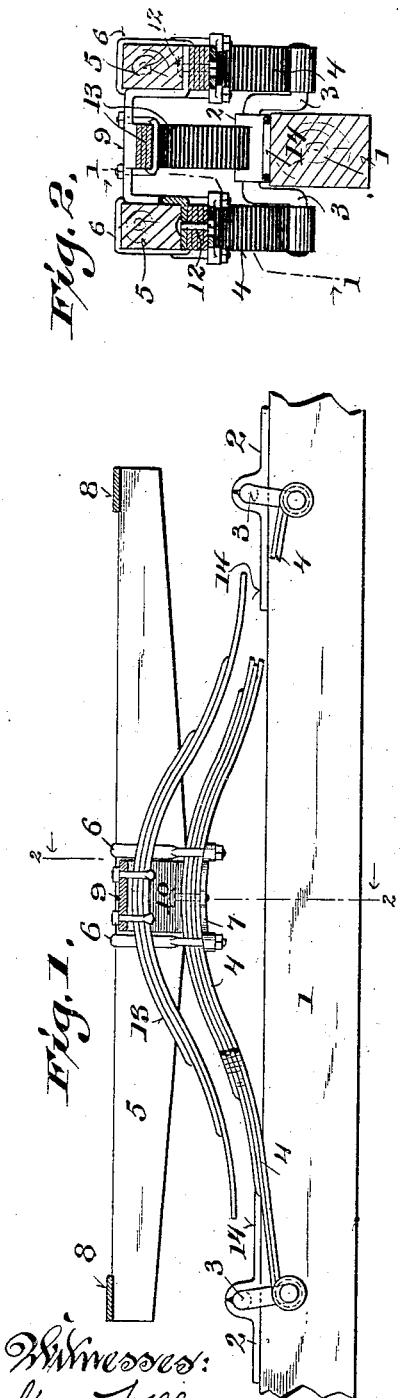
Witnesses:
George Felber
Frank N. Rogers
Inventor:
Henry John Noll.
By Oliphant & Young
Attorneys

UNITED STATES PATENT OFFICE.

HENRY J. NOLL, OF MILWAUKEE, WISCONSIN.

BOLSTER-SPRING.

955,673.  Specification of Letters Patent.  Patented Apr. 19, 1910.

Application filed August 6, 1908. Serial No. 447,257.

*To all whom it may concern:*

Be it known that I, HENRY JOHN NOLL, a citizen of the United States, and resident of Milwaukee, in the county of Milwaukee and State of Wisconsin, have invented certain new and useful Improvements in Bolster-Springs; and I do hereby declare that the following is a full, clear, and exact description thereof.

The object of my invention is to provide a simple, durable and effective bolster spring, its construction and arrangement being such, that owing to an auxiliary spring, the resiliency of the device remains practically constant under varying load conditions within a predetermined maximum and minimum limit.

The invention therefore consists in various details of construction and combination of parts as hereinafter set forth with reference to the accompanying drawings and subsequently claimed.

In the drawings: Figure 1 represents a side elevation of a bolster spring embodying the features of my invention, the view being partly broken away and in section, as indicated by line 1—1 of Fig. 2; Fig. 2, a cross-section of same, the section being indicated by line 2—2 of Fig. 1; Fig. 3, an inverted detail plan view of a spring attaching mechanism; Fig. 4, a perspective view of an auxiliary spring supporting hanger; Fig. 5, a fragmentary sectional elevation of spring-bolster showing another form of auxiliary spring supporting hanger; Fig. 6, a cross-section of the same; Fig. 7, a detail inverted plan view of the auxiliary spring supporting hanger shown in the preceding views, and Fig. 8, a sectional plan view, as indicated by line 8—8 of Fig. 5, showing one of the auxiliary spring clip-plates employed in connection with the supporting-hanger.

Referring by numerals to the drawings, 1 indicates a portion of an ordinary wagon bolster upon which is mounted a pair of brackets 2, the brackets being provided with bearing lugs for U-shaped crank rods 3 arranged to straddle the bolster. The ends of the cranked rods serve as hangers for a pair of semi-elliptical leaf-springs 4, which springs have mounted thereon a pair of bolster-bars 5 that are secured thereto by clip-bolts 6 in connection with spanner-plates 7 fitted under said springs there being tie-plates 8 connecting the bolster-bar ends. As best shown in Fig. 2, the said bolster-bars and springs are so located that when subjected to a maximum load they are free to move downward at either side of the bolster, being limited in this movement by contact of the tie-plates with the bearing lugs of the brackets. All of the above described mechanism constitutes a common form of bolster-spring now in use and forms no part of my invention, which, as previously stated consists in providing an auxiliary spring arranged to be attached and supported by the bolster-bars.

Referring to Fig. 1 of the drawings, 9 represents a hanger having a central spring seat and provided with depending sides 10 abutting the inner faces of the bolster-bar 5. The depending sides 10 of the hanger terminate with laterally extending feet 11 which are interposed between the bolster-bars and adjacent upper leaf of each of the springs 4, all of the leaves of which springs are confined by bolts 12, the said bolts also serving to bind the hanger-feet by passing through apertures therein as shown. A semi-elliptic spring 13 is clipped to the seat of the hanger 9, the lower leaf of which spring terminates with flattened ends that are normally disposed above rub-plate extensions 14 constituting portions of the brackets 2. The above arrangement of attaching the auxiliary spring, while not affecting the standard bolster-spring structure, necessitates removal of the springs 4 in order to insert the hanger, and hence is desirable when the auxiliary spring is to be applied during the manufacture and assemblage of the device as a whole. In instances where the auxiliary spring is to be applied to the device as an attachment by unskilled labor however, it is desirable to arrange the hanger for the auxiliary spring in such manner that the parts of the standard bolster-spring shall remain intact, and with this in view I have shown in Figs. 5, 6, 7, and 8 another form of attachment which is as follows: A flat hanger 15, to which is secured the auxiliary spring, is placed crosswise of and upon the upper edges of the bolster-bars between the clip-bolts 6. This hanger is provided with apertures for the reception of bolts 16, which pass through and secure clamping-plates 17, the clamping-plates being fitted over the tie-plates 7 and having ribs 18 adapted to impinge against the bottom leaf of each spring 4, as best shown in Fig. 8 of the drawings. Thus it will be seen that to assemble and attach this last form of auxiliary spring, it only requires a wrench to tighten the nuts of bolts 16 upon the clamping-plates.

Should a vehicle be equipped with my improved device and carrying a light load, the result will be apparent that the strain would come only upon the springs 4, which springs are of sufficient resiliency to insure smooth running. Should the load be increased however and tend to collapse these springs beyond their resisting capacity, the auxiliary spring would engage the rub-plate extensions of the brackets and act as a reinforce or reserve power to resist the overloaded springs whereby the same resiliency of the bolster is maintained even though the load be much greater than the standard springs could properly take care of. The auxiliary spring also serves as a check in preventing the tie-plates at the end of the bolster-bars from striking the bracket lugs. Attention is also called to the fact that should the standard springs be of sufficient strength to resist the load of the combined springs, as shown, they would be ineffective under a light load, and consequently defective for the purpose for which they were intended.

While I have shown the auxiliary spring suspended by a hanger crosswise of the bolster-bars, it is apparent that a hanger lengthwise of said bolster-bars may be used, in which case it would be secured to the aforesaid bolster-bar through the medium of the tie-plates. In all cases however said auxiliary spring is suspended between and supported by the bolster-bars, the spring being arranged to exert pressure upon the bolster proper.

I claim:

In a vehicle bolster-spring, having bearing-brackets adapted to be mounted upon the vehicle-bolster, cranked rods carried by the bearing-brackets, semi-elliptical mainsprings supported by the cranked rods, parallel bolster-bars secured to the springs, and tie-plates connecting the bolster-bar ends; the combination of a centrally disposed hanger extending crosswise of the bolster-bars, a spring-seat carried by the hanger intermediate of the bolster-bars, clip-bolts for the hanger bolster-bars and semi-elliptical springs, an auxiliary semi-elliptical spring fitted to the hanger-seat, clip-bolts for securing the auxiliary spring to said hanger-seat, the auxiliary spring being approximately parallel with the main spring and having its ends adapted to contact with the vehicle-bolster under a maximum load strain.

In testimony that I claim the foregoing I have hereunto set my hand at Milwaukee, in the county of Milwaukee and State of Wisconsin in the presence of two witnesses.

HENRY J. NOLL.

Witnesses:
 GEO. W. YOUNG,
 GEORGE FELBER.